(12) United States Patent
Tobin, Jr.

(10) Patent No.: US 8,577,748 B1
(45) Date of Patent: Nov. 5, 2013

(54) SYSTEM AND METHOD FOR ALLOCATING TICKETS USING A DRAFT

(75) Inventor: Charles Michael Tobin, Jr., Bethesda, MD (US)

(73) Assignee: Draftix, Inc., Bethesda, MD (US)

( * ) Notice: Subject to any disclaimer, the term of this patent is extended or adjusted under 35 U.S.C. 154(b) by 502 days.

(21) Appl. No.: 11/904,065

(22) Filed: Sep. 25, 2007

Related U.S. Application Data

(60) Provisional application No. 60/846,861, filed on Sep. 25, 2006.

(51) Int. Cl.
*G06Q 30/00* (2006.01)
(52) U.S. Cl.
USPC ........................................ 705/26.4; 705/27.1
(58) Field of Classification Search
USPC .................... 705/26, 27, 26.1–27.2
See application file for complete search history.

(56) References Cited

U.S. PATENT DOCUMENTS

| | | | | |
|---|---|---|---|---|
| 2004/0006497 | A1* | 1/2004 | Nestor et al. | 705/5 |
| 2004/0153374 | A1* | 8/2004 | Nelson | 705/26 |
| 2004/0230440 | A1* | 11/2004 | Malhotra | 705/1 |
| 2005/0102190 | A1* | 5/2005 | Thiam | 705/26 |
| 2007/0005437 | A1* | 1/2007 | Stoppelman | 705/26 |

OTHER PUBLICATIONS

Bergen, K. (Sep. 11, 2005). The internet asks: Need a ticket? ; the growing number of online ticket-resale sites offering seats at prices higher than face value has given scalpers a legitimacy they never enjoyed before. Orlando Sentinel, pp. 1-H1.*

* cited by examiner

*Primary Examiner* — Jeffrey A Smith
*Assistant Examiner* — Resha Desai

(57) ABSTRACT

The present invention is a system and method that enables individuals, partnerships, companies and any other entity to ease the ownership and administration of ticket lots and other properties by alleviating the difficulties mentioned above. The system achieves this by providing a utility to build ticket or time-share member groups by matching compatible users and to allocate to the group's members shares of ticket lots or access to properties by time-share or rental. The system establishes user compatibility and ticket and property allocation based on requirements, preferences and attributes of the group, the ticket or property, and the system users. For example, a website based on the system of the present invention can be used by a holder of a season ticket package in order to connect with website users seeking a share of such tickets, form a member group of such users that are compatible with parameters set by the season ticket holder, and automatically allocate the tickets equitably to group members based on ticket event attributes, requirements and preferences indicated by the members and ticket allocation rules set by the ticket holder.

20 Claims, 1 Drawing Sheet

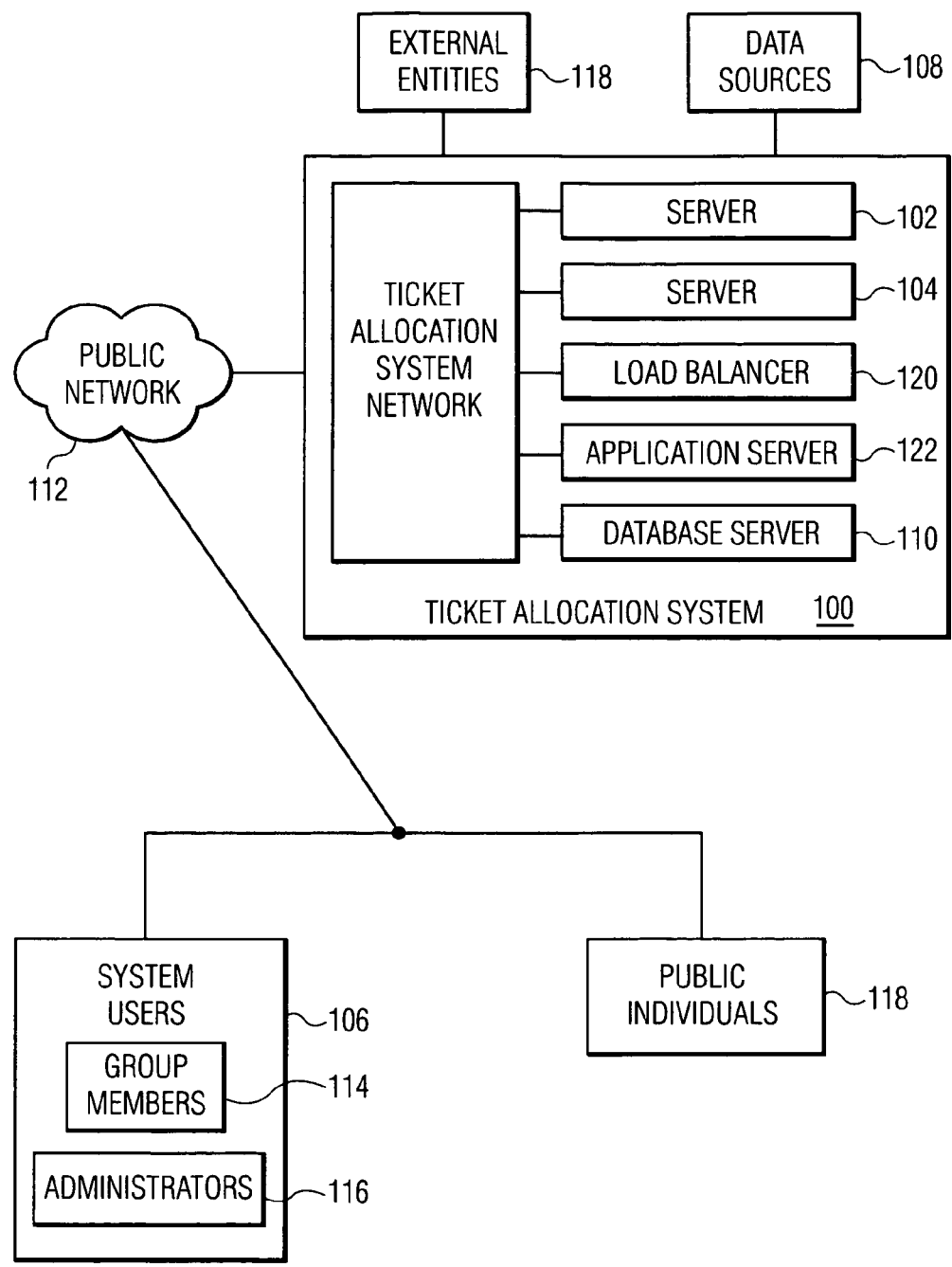

US 8,577,748 B1

SYSTEM AND METHOD FOR ALLOCATING TICKETS USING A DRAFT

This application claims the benefit of U.S. provisional application No. 60/846,861, filed Sep. 25, 2006.

BACKGROUND OF THE INVENTION

Obtaining and administering season tickets for events, such as sporting, entertainment, and cultural events, can provide the holder many benefits. Consistent and known seating assignments, preferential treatment, and access to tickets for difficult to obtain events, such as sports playoffs, is greatly simplified. However, a significant barrier to owning season tickets is their cost due to the number of tickets that must be purchased. For example, season tickets for Major League Baseball require the purchase of eighty one regular season game plus exhibition games. Few people have the time, interest or finances to attend eighty one games every season. Similar barriers exist for owning and using properties such as real estate, vehicles, tools and equipment. The purchase, storage and insurance costs that come with owning these properties are prohibitive for many, especially in relation to the frequency with which these properties are used. Ticket groups and property timeshare groups, whereby multiple people combine to share the costs and usage of tickets and properties respectively, provide an option to mitigate these barriers.

Through the use of a ticket group multiple people can obtain a multiple event ticket package, attend the number of events they want, reduce their individual expense, and still get the benefits of a ticket package holder. This approach has its drawbacks too. First, building a group of people with the intent to share tickets requires finding a number of people with the compatible interests. Second, the administration of the group and tickets can be a difficult and time consuming process. For instance, rules must be built governing the distribution, an equitable allocation process must be agreed upon, event and attendance preferences must be gathered from multiple individuals, ticket allocation must be performed, monetary contributions must be gathered, and tickets must be distributed to each individual. This process is difficult enough to preclude people from acquiring ticket packages such as season tickets. Furthermore, many people can not add enough members to a group to make the purchase of season tickets financially viable for the members. Though a group for time-sharing properties, such as vacation homes, cars, aircraft and specialty tools and equipment, may likewise benefit group members, similar problems confront building and administering a property time-share group.

SUMMARY OF THE INVENTION

The present invention is a system and method that enables individuals, partnerships, companies and any other entity to ease the ownership and administration of ticket lots and other properties by alleviating the difficulties mentioned above. The system achieves this by providing a utility to build ticket or time-share member groups by matching compatible users and to allocate to the group's members shares of ticket lots or access to properties by time-share or rental. The system establishes user compatibility and ticket and property allocation based on requirements, preferences and attributes of the group, the ticket or property, and the system users. For example, a website based on the system of the present invention can be used by a holder of a season ticket package in order to connect with website users seeking a share of such tickets, form a member group of such users that are compatible with parameters set by the season ticket holder, and automatically allocate the tickets equitably to group members based on ticket event attributes, requirements and preferences indicated by the members and ticket allocation rules set by the ticket holder. The system helps group members reduce individual costs through ticket sharing, draw from a wider audience to create groups, and exchange tickets and payments in a trusted environment. The preferred embodiment of the system comprises machine readable computer instructions stored on a memory medium of a computer server, a database for holding information concerning users, groups and items, such as tickets or properties, for sharing, and a computer processor for executing the instructions to send and receive information from users via a telecommunications network and to allocate the items based on parameters set by users and stored in the database.

DETAILED DESCRIPTION OF THE DRAWINGS

FIG. 1, is a simplified diagram illustrating the components of the ticket allocation system, the system's connection to a public network and users' connection to the public network by way of a personal computers, personal data devise, pager or mobile telephone.

DETAILED DESCRIPTION OF THE INVENTION

The machine readable computer instructions of the preferred embodiment of the ticket allocation system 100 comprise five distinct software application modules components; administrator and group establishment module, user registration module, selection and notification module, trading module and commerce module. These modules are stored in the memory medium of one or more of the system 100 computer servers 102, 104 that use information collected by the modules from system users 106 and other sources 108, which is stored in one or more database servers 110. Stored information concerns users, groups and items for sharing, such as tickets or properties. A computer processor in the system 100 executes the instruction modules to send and receive information from users via a telecommunications network 112 analyze stored information, and allocate shared items based on information stored in database server 110 that represents attributes, requirements and preferences parameters set by users. The servers 102, 104 may act as a web server. The main software components of the system may use the Windows 2003 operating system. The operating system may use Internet Information Server (IIS) version 6.0. The database software residing on the database server 110 may be a database engine such as Microsoft SQL Server 2005. The commerce module may use Payflow Pro, a PayPal payment processing service via an Application Programming Interface (API). The system's computer instructions may be written using Microsoft's ASP.NET version 2.0, SQL Server 2000 Transact SQL and Javascript. The system may be accessed by users 106 through a graphical user interface (GUI) that is accessible over the Internet or other public network 112.

The administration and group establishment module (ACE) provides a function for a user 106 to create a group by registering as the group's administrator 116, establishing rules that govern the group, and indicating factual details concerning the event(s) for which the group is established. Events handled by the system may be ticketed events or defined access to use a property. The ACE module enables the administrator 116 to build a group consisting of other system users 106 that are the group members 114, and to do so by inviting other users 106 to accept membership in the group or enabling other users 106 to apply for membership in the group and be accepted or rejected as members 114.

Events may be sport games, exhibitions, theatre, cultural events, concerts, and defined dates and times for using properties such as real or personal property. Examples of such real or personal property include motor vehicles, aircraft, watercraft, single family homes, condos, apartments, services, equipment and tools. A ticket may be issued by an event sponsor, organizer or venue. A ticket in the system of the present invention not only refers to a conventional printed or bar coded ticket for an event such as a concert or game, but may also refer to defined date and time access to use personal property or real property, including real property that is itself a conventional time-share to a vacation home. Accordingly, an administrator 116 that owns a conventional time-share may create and administer a group to allocate tickets that each provide a group member 114 with a right to use the conventional time-share right on a specified date.

If a user 106 wishes to create a new group and act as the administrator 116, the user 106 must access the GUI of the ACE module via a telecommunications network 112 to create a new group account and register as the group's administrator. The ACE module GUI enables the user 106 to input into the system databases in the database server 110 information such as the user's name, street address, phone number, credit card, bank account, or other payment information, and email address. The ACE module may confirm the validity, format or completeness of the user's information, including by accessing external entities 118 and data sources 108, and thereafter accept the user 106 as the administrator of the nascent group. The ACE module enables the administrator 116 to establish a user name and unique password. The ACE module is used by the administrator to input information concerning the event for which the group was established, such as property or sports event description, duration of event, venue, location, seats locations, number of tickets, number of ticket sets, cost of tickets, parking pass availability, fees, number of allowable members, number of events, rules, and other pertinent information. The administrator 116 may use the ACE module to define the cost of each available ticket or ticket set, including on a per event basis. The ACE module also collects from the administrator 116 an indication of the group's rules.

The ACE module may interface with published event calendars from data sources 108 and automatically populate the group's GUI with a selectable event calendar. For example, when the event is season tickets for a particular baseball team, the system may display a calendar in the GUI consisting of all games in that team's home season, which the administrator may use to inform the system databases at database server 110 which tickets are available to the group. Alternatively, the ACE module may collect from the administrator 116 specific dates entered by the administrator 116 of only those games for which tickets are available in the group. In either case, the system can use the saved date information to produce a GUI calendar that indicates the dates of event for which tickets are available to the group. The ACE module may also collect from the administrator an indication of whether the administrator 116 owns or controls the event tickets at the time of group creation or whether the tickets need to be purchased by the administrator 116 once the group achieves a number of members 114 defined by the administrator 116. The ACE module may also collect from the administrator 116 the minimum and/or maximum number of group members 114 that the system 100 should allow. Alternatively, the ACE module may automatically calculate and set or propose the maximum or minimum membership thresholds based on the group's number of events, number of ticket sets to each event, number of tickets, cost of tickets, and/or an administrator defined price or price range for each member 114. Setting the membership number thresholds may also take into account the divisibility of the membership number into the number of ticket sets, tickets and event occurrences in the group.

The ACE module is also used to collect the administrator's preferred or required attributes of potential group members 114. In any group, the administrator 116 may or may not elect to be a member 114 that receives tickets under the group's ticket allocation process. All information provided via the ACE module may be stored in the system's database server(s) 110.

The administrator 116 may use the ACE module to invite an individual from the public 118 into the group. To do so, the administrator 116 must input into the ACE module the individual's email address or other contact information, such as instant message or street address. The system 100 of the present invention may utilize a software application module to generate and send one or more email, voice, instant or other messages to the individual 118 over telecommunications network 112, which may include an invitation to join the group, logon information such as a system-established user name and password for the individual 118, and the web site URL. The ACE module may also automatically insert into the message or display any of the group rules, event, ticket or membership information provided to the ACE module by the administrator 116 during group creation.

An invited individual 118 may logon and register as a system user 106 using the User Registration (UR) module. The newly registered user 106 may view a display of the invitation from the administrator 116 and indicate rejection or acceptance of the group membership invitation. Alternatively, the new user 106 may reject or accept membership by replying to the system's invitational message. The administrator 116 may indicate in the ACE module a rule that permits the system 100 to automatically accept an invited individual 118 once it registers as a system user 106 using the logon information provided previously in the invitational message. This rule allows the individual 118 to accept membership by logging on and registering, or reject membership by not taking any action. Alternatively, a group rule may require that the registration of the new user 106 include input of user preferences, requirements and/or attributes, which the system 100 may use to determine whether there is predetermined level of compatibility with the preferences, requirements and/or attributes of the group. If the compatibility level is achieved, the user 106 may be automatically accepted into the group. The compatibility level requirement may be set as a default by the system or set by the administrator 116 as a group rule.

The administrator 116 may set a rule that implements a system 100 function whereby the system modules compare the group's attributes, preferences and/or requirements against the attributes, preferences and/or requirements of registered users 106 that may not be known to the administrator 116, and subsequently send one or more messages either to the administrator 116 indicating compatible users 106 or to the users 106 indicating a compatible group. Such messages may be displayed to the administrator 116 or users using the system's GUI. Also, in a fashion similar to the previously described process whereby users 106 are invited by the administrator 116 and accepted into group membership, messages may be automatically generated and sent by the system 100 to compatible users 106, whereupon such users may be accepted as group members 114 by the system 100 either automatically or with approval by the administrator 116. The system 100 will continue in this fashion until membership of the group satisfies the group's rule concerning minimum or maximum membership number.

Additionally, an individual 118 seeking to join a group may register as a system user 106 using the UR module and apply to join an existing group using the system's messaging functions. The administrator 116 may set a group rule that requires the system 100 to automatically accept or reject the user 106 into the group membership based on the group rules established by the administrator 116. Alternatively, the system 100 may generate and send or GUI-display a message to the administrator 116 concerning the user's desire to join, as well as optionally the user's preferences, requirements or attributes, whereupon the system 100 will then enable the administrator 116 to approve or reject the user's application. Preferences, requirements and attributes may be based on property or event details, property location, seat location, number of seats per game, weekday, month, specific dates, number of event occurrences, game commitment, payment or credit card information or verification, intended use of tickets (e.g., personal or business), geographic location, user age, gender, marital or familial status, and, for sporting events, which team the user 106 prefers. The system 100 may generate a message to the user 106 advising that the user 106 it is not eligible for membership based on low compatibility. The system 100 may be used to propose the creation of new groups based upon compatibility amongst users 106. The system 100 is also capable of informing a group administrator 116 of all user 106 requests to join the group. If a user's request to join a group is accepted by the group administrator 116, the system 100 may be set to provide a message to the requesting user 106 that is the aforementioned invitational message to join the group. The system 100 also provides a function available to the administrator 116 whereby the system 100 will automatically send an invitational message to join a group to any user 106 that requests to join as a member 114 of that group. Upon receipt of a request from a user 106 seeking to become a group member 114, the system 100 is able to automatically generate and send or display a message to the administrator 116 with details on the user 106, such as the user's attributes, preferences or requirements. The administrator 116 will then message or log on to the system 100 and dispose of (approve, reject, approve with conditions) the user's application for membership. This option can be used to guarantee payment for tickets prior to the ticket allocation. For example, if membership requires that group member 114 purchase two seats for ten games at $25 per seat, the system 100 may require user 106 pay $500 or some other amount online via multiple payment options prior to the user 106 becoming a member 114 and being allowed into the allocation process. Requiring this prior payment could be a condition for approving a user's application for membership. Users 106 can only join groups that have a ticket allocation date in the future and where a maximum number of group members 114 has not been reached.

The ACE module enables the group administrator 116 to create rules that will govern the ticket allocation process. A rule may govern the number of tickets each member 114 will acquire or commit to acquiring. For example, the administrator 116 may require the same number of events, tickets or ticket sets per member 114. The administrator 116 may set a rule that allows members 114 to request allocation of a specified number of tickets, ticket sets or events. The administrator 116 may set a rule that excludes certain games from the group allocation. The administrator 116 may set a rule that determines whether the system 100 will allocate tickets automatically based on member 114 preferences and requirement, or whether the group members 114 will manually select their tickets from a list of available tickets. The system 100 is capable of processing all event requirement and preferences information of the members 114 and thereafter allocating tickets to the members 114 in order to satisfy or match the most requirements and/or preferences of the members 114 equitably across all the members 114. This mode of allocating tickets may result in whole or partial satisfaction of all requirements and preferences of all the members 114.

The ACE module enables the administrator 116 to set rules concerning how to divide tickets for each event. If a group holds a certain number of seats per event, the administrator 116 may divide these tickets into ticket sets. For example, using eight as the number of tickets per event, the administrator 116 could define four sets of two tickets, or one set of four tickets and two sets of two tickets, or one set of eight tickets. In order to eliminate the potential that some members 114 are allocated tickets to more events than other members 114, the group administrator 116 may reduce the number of available events or ticket sets to a number that is divisible by a natural number of members 114 without a fractional remainder. For example, the system 100 will prompt the group administrator 116 to define a number of members 114 that divides in this manner into the number of games or ticket sets in the season. The administrator 116 may remove enough games or ticket sets from availability to the group until the divisible number is achieved, thereby resulting in each member share being eligible for the same number of tickets. The administrator's rules may allow any group member 114 to purchase more than one position in the ticket allocation.

The ACE module assigns a unique list identifier to each group member 114. For example, sequential numbers may be used as list identifiers. The ACE module may assign randomly or based on order of acceptance into the group, a unique list identifier to one or more members 114, or allow the administrator 116 to assign a unique list identifier to one or more members 114.

An allocation administration rule is also applied to the members' list identifiers in order to establish the relative pick positions of the members 114. A single draft administration rule can be used to govern the grant of pick positions for all the rounds of the allocation. Alternatively, different allocation administration rules may be used for different rounds of the draft. The allocation administration rule options available include sequential, progression/regression, random and other formulae.

According to the sequential allocation administration rule, the members 114 are granted relative pick positions such that the position of each member's pick relative to the position of the other members' picks is the same as the position of the member's assigned list identifier relative to the position of the other members' allocation list identifiers. The rule is available where to the allocation list identifier are of a type that indicate a relative position in relation to other allocation list identifiers, such as sequential numbers or alphabet letters. For example, where the allocation list identifiers are a sequence of consecutive numbers from one to the number of members 114, a member 114 assigned the number one as its allocation list identifier would be granted the first pick, the member 114 assigned the number two as its allocation list identifier would be granted the second allocation pick, and so forth until the member 114 assigned the number equal to the number of members 114 would be granted the last pick of the allocation round in question.

According to the progression/regression allocation administration rule, where the list identifiers are of a type that indicate a relative position in relation to other allocation list identifiers, the system 100 grants the member 114 with the first allocation list identifier the first allocation pick, the member 114 with the second allocation list identifier the second pick, and so forth until the member 114 with the last allocation list identifier is granted the last pick of the first round of the allocation. For the second round, the members 114 are granted allocation picks in an order that is reverse of the order granted in the first round. This ordering scheme is repeated for all subsequent rounds such that allocation picks in odd numbered rounds are granted to members 114 in the same order as the first round, while allocation picks for even numbered rounds are granted to members 114 in the same order as the second round.

With a random allocation administration rule, the members' relative positions will be randomly identified by the system 100. With random selections, the members' allocation list identifiers need not indicate relative positions to each other. The system 100 is capable of implementing other allocation administration rules that are a function of logic formulae, such as recursion. The administrator 116 may elect to use any of these allocation administration rule for some, all or none of the allocation rounds.

The Selection and Notification Module (SAN) implements the actual ticket allocation process, which may also be referred to as a ticket draft process. The module is designed to use the group rules and member preferences and requirements to allocate tickets sets equitably to members 114. A ticket set may include as few as one ticket. Where the group offers only one ticket set per event, the event is equivalent to the ticket set. The prepicker is a feature unique to the system of the present invention that is not possible using a conventional off line manual ticket allocation process. Since many groups will include a large number of ticket sets, a system 100 function provides automatic ranking of ticket sets for a group member 114 instead of requiring the member to assign a numerical rank to each ticket set. The prepicker allows members 114 to rank various event preference or requirement criteria so the system 100 can automatically assign ranks to the events. Criteria may be based on any of the ticket information captured from the group's administrator 116 or the member 114. Criteria include ranking game opponents (i.e., which opponents does the member 114 wish to see play the home team). Members 114 can also set a criteria preference or requirement concerning day versus night events or weekday versus weekend events. Members 114 can also indicate criteria based on the time, date, month or season of the event's occurrence for which they prefer or require tickets. For each of the criteria the member 114 may also indicate its preference as high, medium or low, or ignore, or on a numerical or alphabetical scale. This will instruct the system 100 in assigning relative ranks. Criteria may represent fields in the system's database 110 and may be selectable by members 114 using check boxes or drop down menus in the GUI provided by the system 100. The system's assignment of relative rankings may utilize looping through all of the events to identify those that satisfy highly rated criteria. For example, if the member 114 has indicated only one high preference criteria that is the competing sports team attribute, and has indicated only one preferred competitor, the Phillies, the SAN module would loop through all events and place all games against the Phillies at the top of the member's initial rankings. If more than one preference criteria are indicated, the SAN module may loop through events, identify all events that satisfy high preference criteria, all events that satisfy medium preference criteria, and all those that satisfy low preference criteria. The SAN module will then provide initial rankings that place the events that satisfy the high preference criteria at the top of the list, followed by medium preference events, followed by low preference events, followed by an unranked listing of remaining events. Accordingly, the SAN module uses conditional logic to determine to which event attributes the member 116 has assigned a preference criteria, and uses an algorithm to iteratively compare the preference criteria to the attributes of each event (e.g., competitor, day game, evening game, weekend, weekday game, etc) and assign initial rankings.

The next step in the ranking process is for the member 114 to rank any individual events that they wish to have allocated by the system 100. The system 100 permits a member 114 to assign a rank to an individual event or relative ranks to a series of events. The latter is especially helpful in baseball where a specific opponent may be in town for a three game series. Rather than just selecting an individual game, a member 114 can assign the same rank to all games in the series so that if any one of the games is available to the member 114 during a round of the allocation process it will be allocated to the member 114. A rank assigned to an event in this process may receive priority over a rank assigned to an event by the prepicker, or vice versa. A member 114 can rank as many or as few events as they like.

The SAN module also has a function allows a member 114 to rank a specific events in numeric order at a series level. A series ranking pertains to a set of events that are grouped together as a series. For instance, if the Orioles are playing a three game series with the Phillies from 1/1-1/5, the member 114 may rank all of these events as a 1, as an alternative to the SAN module only being capable of permitting the member 114 to rank one of the games as first pick. If any of these series games are available to the member 114 during ticket allocation, the result will be that the member 114 receives tickets for just one of those games, subsequent allocations for the member will attempt to allocate ticket for events second and lower.

An additional step in the events ranking process is to allow the member 114 to review the consolidated event ranks. This will show the rank assigned to all events based on the member's individual event ranking, the prepicker's determination and any other requirements or rules set by the administrator 116 or member 114. The member 114 may elect to change ranks at this time and save the information to the database 110 of the system 100 of the present invention. The member 114 can change any event rankings up until the draft executes. The member 114 may be prohibited from changing event rankings that are required to satisfy administrator 116 rules.

The allocation of events by the SAN module is based upon the ranks assigned to each event and the members' relative positions in each allocation round. Once a member's turn comes in an allocation round, the SAN module will examine the member's event ranks and allocate to the member 114 the highest ranked event still available to the group members. The allocation process is complete when all events are allocated to members 114. The administrator 116 may indicate a group rule that requires the SAN module to randomly assign a relative allocation position to each member 114 for the first round. This first round allocation position will indicate the order in which each member's turn comes for ticket allocation in the first round. To determine the order in which members 114 are allocated tickets in subsequent rounds, the SAN module will apply the group's allocation administration rule (e.g., sequential, progression/regression, random, etc.) to the first round relative allocation positions of the members 114. Alternatively, once membership building is complete, the administrator 116 may indicate to the SAN module the first round relative allocation positions of some or all group members 114. This may be useful for an administrator 116 that is also a member 114 of the group and wishes, notwithstanding the group's allocation administration rule, to have the first pick during the first or subsequent rounds, or wishes to give particular members 114, such as invited members 114, earlier draft priority positions than the positions of other members 114 during the first or subsequent rounds. Once the draft is complete, the SAN module will generate a message or display to each member 114 informing them of their allocated events. At this time, the system may also calculate ticket cost charges owed by each member 114 and issue an invoice, or charge their credit card or bank account accordingly. The results of the draft will also be saved to the group page and will be accessible by group members 114.

The SAN module also allows a member 114 or administrator 116 to set a requirement of day or time spacing between allocated events, thereby prohibiting the automated ticket allocation from assigning tickets to events that occur within the set number of days or clock time. This allocation requirement avoids allocation of excessive events during a particular time frame. A simple lookup algorithm may be used to lookup the events previously allocated to the member 114 and their dates or times, and compare such information against the date or time of the proposed event that is proposed for allocation to the member 114 according to the allocation process. If the spacing requirement is satisfied, the proposed event will be allocated to the member 114. Otherwise, the allocation process will move through the rankings to propose another event, including with consideration of the spacing requirement. If no available events satisfy the spacing requirement, the SAN module will allocate an event based on the aforementioned preference criteria and member rankings.

Once maximum or minimum membership thresholds are satisfied or an administrator defined date and time is reached, the SAN module will begin the ticket allocation process either automatically as described above based on rankings, or in a manual fashion whereby each member 114 must access the system 100 once their turn comes up in an allocation round and interact with the system's GUI in order to view and select events from a listing of available events. The same rules that govern automatic allocation be applied to a manual allocation, however, the individual members 114 will not need to set event preferences or requirements or indicate rankings. The system 100 may provide instant notification via a message over telecommunications network 112 to the member 114 of when their turn comes up in an allocation round, such as via GUI display, email, IM or pager. Once the member 114 select an event, the next member 114 in the allocation will similarly be notified, view available event and select an allocation. This process will continue until all events are allocated. The administrator 116 may set a rule whereby the group's manual allocation requires all members 114 to remain logged on the system 100 at the same time in order to make event selections until all events are allocated and there are no further allocation rounds.

The system 100 may conduct event allocations based on each group member 114 being allocated only a share of tickets. For example, if a group has ten members 114 and the total number of events is 80, the system 100 may disallow any member 114 from participating in allocation round if the member 114 has been allocated its share eight events, while others that have not received their full share may continue to participate in allocation rounds. This manner of conducting an allocation may be used in order to permit any member 114 to pass on a ticket allocation in a particular allocation round and thereby delay such ticket allocation until a later round. This feature may be useful in manual allocations, where a member 114 may find it inconvenient to select a ticket allocation during a particular allocation round and passes on selection in order to permit the allocation process to continue for the other group members 114. The only exception to shares being equivalent in number of events is that if the total number of group events divided by the number of users has a remainder, then it is possible for some members 114 to receive one additional event than other members 114. For example, if there are 81 group events and ten members 114, it is possible for one member 114 to receive nine events while other members 114 receive eight.

Once all tickets are distributed and the draft is complete, the event calendar may be updated to indicate to which members 114 events were allocated. This calendar may be viewable to all group members 114.

The Commerce and Payment (CAP) module is an ecommerce system that may be a function of the system 100 and allows the administrator 116 to receive payment from group members 114, or users 106 that are group member applicants, for events via a credit card or other payment interface. Such payment may be required prior to acceptance as a group member 114 or entering an allocation process. For nonexistent groups that the system 100 proposes for creation based on an analysis of system users' 106 attributes, requirements and preferences, the CAP module may be used to accept payment from joining members 114 so that a group administrator 116, member 114 or third party may purchase tickets on behalf of the group. The CAP module may be used to exchange payments that are part of any ticket trades using the event trading module of the system 100.

Another unique feature of the system 100 is event trading. The advantages of an online system make trading tickets more efficient amongst system users 106. A difficulty in trading outside of the inventive system 100 is finding other individuals willing to trade. However, with the community of users 106 created by the system 100 of the present invention there is a significantly larger audience with whom to trade events. Trading via the system 100 may occur with members 114 belonging to other groups or possessing tickets to other events, rather than just occurring within a member's 114 specific group or package of events.

Another module of the inventive system 100 provides system users 106 with the ability to trade individual events with other users 106. Trading agents may be defined by users 106 and will automatically execute periodically to find matches for other trading agents that have been defined by other users 106. If a trading agent is matched up with another trading agent, the system will message information about the match to both trading agent users 106. The users 106 can communicate with one another using the system's 100 messaging module to discuss terms of their trade agreement. Trading agents are defined by event attributes, duration of trade agent existence, and whether the trade agent represents a user's search for tickets to an event or willingness to trade event tickets in the user's possession for specified consideration. Trading agents post to a general trade posting GUI that all users 106 have access to. Any user 106 act upon a trading agent that is posted by communicating with the user 106 that established the trading agent using the messaging module of the system 100.

Another module of the inventive system 100 provides system users 106 with the ability to define criteria for searching open ticket groups and to save such search criteria as a search agent. Search agent criteria are defined in terms of event and group attributes, preferences and requirements. Search agents will automatically execute periodically to find open groups that are compatible with the user's search criteria. If a search agent is matched up with an open group, the system 100 may message the user 106 that created the search agent that there is an open group available. The user 106 of the search agent can communicate to the group administrator 116 and request to join the group using the system's messaging module. Open groups are posted to a general open group listing. Any user 106 can search for an open group using this listing and act upon an open group by submitting a request to join the group. Open groups do not include any group that does not permit acceptance unsolicited user requests to join the group.

The system 100 may include a commerce module that enables the exchange of tickets and money between users 106. A group administrator 116 may require that, prior to the allocation process, group members 114 are charged an amount set by the administrator 116. This amount may be based on an estimated or actual minimum ticket cost for each group member 114 and may be calculated by the commerce module. The administrator 116 may create a group rule in the ACE module that requires payment of the charge as a condition for users 106 to join as members 114 of the group. Additional charges may be assessed to members 114 after the allocation is complete and final actual ticket costs are calculated by the system 100. Once the allocation is completed, the system 100 enables the administrator 114 to view or print out a report that lists which members 114 receive which tickets. The commerce module may also permit the administrator 116 to print out shipping bill for each member 114. The tracking number from the shipping bill will be logged into the system 100. This allows the system 100 to track when tickets have been received by the member 114.

One embodiment of the system 100 utilizes object oriented techniques in its overall architecture. The system's application and administration portal architecture may consist of the following core areas: Presentation layer, Framework, Portlets, Services, Interfaces and Data layer. The presentation layer is developed in Hypertext Markup Language (HTML). The system 100 utilizes a combination of HTML, graphics and core active server page objects to render the appropriate graphics to the end users. The Dot Net framework permits easy segmentation between the presentation layer and the data/interface layer. This allows HTML developers to focus on HTML without having to understand the complexities of the underlying code. The system 100 may comprise portlets that are reusable Web components that display relevant information to portal users. For example, a "My Groups" portlet may show a user 106 to view the event groups that the user 106 belongs to. The portlets are reusable self-contained applications that can be plugged into any page supporting its standards. Each portlet is a self contained object developed to be reusable in throughout the overall framework. Since each portlet is an encapsulated object, it can be reused on any page. This reduces overall maintenance and enables the coding process by standardization thereby increasing productivity and minimizing human resource needs.

The application of the system 100 may provide the following services that expose themselves as user interfaces: Search/Trade Agent, Mail, Event Logging, Payflow Pro and Shipping. The search and trade agent matching service utilizes the user defined search agent or trade agent to automate the searching/matching of a user's preferences, attributes and requirements against those of the open groups and open trades that may be posted on the web GUI of the system 100. When a match is found, the appropriate users 106 are notified via the Mail Service that a match has occurred. Additionally, each agent has a defined frequency so that the users 106 can be alerted at their own defined discretion (daily, every three days, weekly). The mail service interfaces with the agent service and directly interfaces with the system application to provide messaging services to end users 106. The service utilizes mail templates that define the format, style and type of information to be retrieved from the database 110 for automated system messaging. Additionally, the mail service queues and processes all user mail and routes the mail to the appropriate individuals using the appropriate format (HTML vs Text). The mail service utilizes SMTP email for external outbound email and simple text for internal database driven mail.

The system's commerce module utilizes Payflow Pro, a PayPal payment processing service via an Application Programming Interface (API). Payflow Pro is a scalable, completely customizable payment processing solution and allows the system managers direct control over the functionality, look and feel of the commerce module.

The system 100 may include a shipping module which may use an API provided by a courier service to integrate with the courier's overnight and ground delivery services into the system's online environment. This shipping API integration allows system managers to customize a shipping solution that seamlessly integrates shipping, tracking and rate estimation into the inventive system. By integrating to the courier's application interface, system managers are able to offer a full ticket guarantee on all tickets tracked by the system 100 by importing tracking numbers into an order management system module. From ticket allocation to final ticket fulfillment, the system managers may remain aware of the status of ticket shipments by using the tracking integration provided by the courier service. This permits system managers to identify and remediate disputes based on failure to deliver tickets to group members in accordance with the results of the ticket allocation process and other group rules.

The data layer stores all information for all of the system applications. The data layer encapsulates all functions for optimal storage and provides all functions to search, insert, update, delete all data for every function within the applications.

One embodiment of the system 100 is installed on a dual processor (2 Ghz, Opteron) Hewlett Packard server 102 with 2 GB of Random Access Memory (RAM). The server 102 is outfitted with three 120 GB drives using a Redundant Array of Independent Disks configuration 5 (RAID 5) implementation. This configuration utilizes block interleaved distributed parity which provides data and error striping at the byte level. The server 102 is acting as a web server and database server. Two web application servers 102, 104 may be used for load balancing. To accommodate the growing number of users, the system infrastructure can easily expand and adapt by adding web servers based on a factor of 1 web server per 200,000 users. The load on each web server 102, 104 will be balanced by a load balancer 120 in an overall cluster and communicate to a redundant database server 110 architecture using replication services. A storage array may be used in the database server 110 for all database and file storage. The system 100 may use Microsoft SQL Server 2005 as a relational database engine to support its data storage needs. The data layer is highly scalable through advancements in table partitioning, snapshot isolation, and 64-bit support. The system software application may run the Windows 2003 operating system on an application server 122 of the system 100. The system 100 may utilize distributed transaction services which allow the system 100 to automatically extract, transform and load a variety of data feeds from data sources 108 or external entities 118 into the application like event schedules and rss feeds. All credit card and password information in the system is encrypted using a 128 bit Private Key encryption utilizing the Data Encryption Standard (DES). One embodiment of the system 100 was developed in Microsoft's ASP.NET version 2.0, SQL Server 2000 Transact SQL and Javascript. The applications utilize the Internet Information Server version 6.0. All secure communications by the system 100 with regard to payment processing and registration utilizes a 128 bit Secure Sockets Layer (SSL). SSL encryption helps ensure that information is kept private between the system web server and the user's 106 web browser. The system 100 may employ the use of a firewall to prevent network attacks and prevent denial of service issues. The firewall also performs VPN duties so development personnel and management can appropriately administer and manage the servers 102, 104, 110, 122. All system applications may use role based security to access specific and appropriate functions. The system 100 may be set up such that only one account allows the web applications to interface with the operating system and the database server 110. This account is a user level account with minimal privileges. All other administrative accounts in the system 100 require authentication with complex password strength.

What is claimed is:

1. A method for allocating items in a draft using a networked system, comprising the steps of:
    receiving information concerning a plurality of items from a seller of said plurality of items over a communications network, wherein each item has a date of use which is different from the date of use of every other item in said plurality of items;
    sending to a plurality of buyers over the communications network said information concerning said plurality of items, wherein said plurality of buyers are members of a group identified in the system that have each paid a fee for every item of said plurality of items allocated to said each buyer in the draft; and
    allocating after all buyers of the group have paid said fee at least one item of the plurality of items to each buyer of the plurality of buyers in accordance with one or more parameters set by at least one of the seller and the buyers,
    wherein the above step of allocating is carried out by a server containing machine readable instructions stored on a memory medium which, when executed by a processor, enable the server to carry out the above step of allocating.

2. The method defined in claim 1 wherein said parameters indicate a respective rank of two or more of the plurality of items.

3. The method defined in claim 2 further comprising the step of determining said respective rank by comparing attributes concerning said two or more items to criteria indicated by a buyer wherein said step of determining rank is carried out by the server containing machine readable instructions stored on a memory medium and said instructions, when executed by the processor, enable the server to carry out the step of determining said respective rank.

4. The method defined in claim 2 wherein said rank is indicated by a buyer.

5. The method defined in claim 1 wherein said parameters rank two or more of the plurality of buyers.

6. The method defined in claim 5 wherein said step of allocating includes allocating at least one item of the plurality of items to a buyer based on receiving from said buyer a selection of said one item from a plurality of the items that have not been allocated to another buyer of the plurality of buyers and excluding said selected one item from the plurality of items that may be allocated to the plurality of potential buyers.

7. The method defined in claim 1 further comprising the step of determining that said plurality of buyers in the group has reached a minimum number, wherein said step of determining is carried out by the server containing machine readable instructions stored on a memory medium and said instructions, when executed by the processor, enable the server to carry out the step of determining.

8. The method defined in claim 1 wherein said parameters are attributes of said plurality of items.

9. A system for allocating items in a draft over a communications network, comprising:
    a database for storing information concerning a plurality of items available for purchase from a seller of said plurality of items, wherein each item has a date of use which is different from the date of use of every other item in said plurality of items; and
    a server containing machine readable instructions stored on a memory medium which, when executed by a processor enable the server to:
    send to a plurality of buyers over the communications network said information concerning said plurality of items available for purchase, wherein said plurality of buyers are members of a group identified by the server that have each paid a fee for every item of said plurality of items allocated to said each buyer in the draft; and
    allocate after all buyers of the group have paid said fee at least one item of the plurality of items to each buyer of the plurality of buyers in accordance with one or more parameters set by at least one of the seller and buyers.

10. The system defined in claim 9 wherein said parameters indicate a respective rank of two or more of the plurality of items.

11. The system defined in claim 10 wherein said server further contains machine readable instructions stored on the memory medium which, when executed by the processor enable the server to determine said respective rank by comparing attributes concerning said two or more items to criteria indicated by a buyer.

12. The system defined in claim 10 wherein said rank is indicated by a buyer.

13. The system defined in claim 9 wherein said parameters rank two or more of the plurality of buyers.

14. The system defined in claim 13 wherein at least one item of the plurality of items is allocated to a buyer based on a selection from said buyer of said at least one item from a plurality of the items that have not been allocated to another buyer of the plurality of buyers.

15. The system defined in claim 9 wherein said parameters condition said allocation on said plurality of buyers reaching a minimum number.

16. The system defined in claim 9 wherein said parameters are attributes of said plurality of items.

17. A method for allocating sets of one or more tickets for events using a networked system, comprising the steps of:
    receiving at a server in the networked system information from a seller concerning a lot of ticket sets available from said seller, each set of said lot consisting of one or more tickets for an event that does not coincide with the event of the one or more tickets in each other set in said lot;
    providing over a communications network said information to a group of buyers of said tickets sets, wherein said group is identified in the server;
    receiving at the server an indication from each of said buyers that said buyer will pay a fee for every ticket set allocated to said buyer in a draft; and
    allocating after receiving said indication from all of said buyers in said group at least one ticket set of said lot to each buyer of said group, wherein the above step of allocating is carried out by a server containing machine readable instructions stored on a memory medium which, when executed by a processor, enable the server to carry out the above step of allocating.

18. The method defined in claim 17, wherein each buyer is ranked relative to the other buyers in the group and the step of allocating consists of allocating to each buyer in order of ranking a ticket set from the lot that has not been allocated to another buyer.

19. The method defined in claim 18, wherein said step of allocating assigns a ticket set to a buyer in the group that is the ticket set ranked the highest for that buyer relative to other ticket sets in the lot and excludes that ticket set from the lot of ticket sets that may be allocated to a buyer in the group.

20. The method defined in claim 19, wherein said ticket set rank relative to the other ticket sets in the lot is determined by comparing ticket set attributes to criteria indicated by a buyer.

* * * * *